United States Patent

Yanagisawa

Patent Number: 5,771,249
Date of Patent: Jun. 23, 1998

[54] ATM CELL SYNCHRONOUS SYSTEM

[75] Inventor: Shigeki Yanagisawa, Kouza-gun, Japan

[73] Assignee: Toyo Communication Equipment Co., Ltd., Kanagawa, Japan

[21] Appl. No.: 523,191

[22] Filed: Sep. 5, 1995

[51] Int. Cl.$^6$ .............................. H03M 13/00; H04L 7/00
[52] U.S. Cl. ........................................... 371/47.1; 370/509
[58] Field of Search .................... 371/42, 47.1; 375/365, 375/366, 354, 359; 370/509

[56] References Cited

U.S. PATENT DOCUMENTS

| 5,282,215 | 1/1994 | Hyodo et al. | 371/42 |
| 5,345,451 | 9/1994 | Uriu et al. | 371/42 |

OTHER PUBLICATIONS

Bahl et al., "Shortened Cyclic Code with Burst Error Detection and Synchronization Recovery Capability", IBM Technical Disclosure Bulletin, vol. 16, No. 6, Nov. 1973, pp. 2026–2027.

Ely et al., "High–Speed Decoding Technique for Slip Detection in Data Transmission Systems Using Modified Cyclic Block Codes", Electronics Letters, vol. 19, No. 3, Feb. 3, 1983, pp. 109–110.

Primary Examiner—Stephen M. Baker
Attorney, Agent, or Firm—Koda & Androlia

[57] ABSTRACT

An asynchronous transfer mode (ATM) cell synchronizing method and circuit used in a digital network system in which: an 8 bit ATM cell stream of a received signal is inputted into a five-stage D flip-flop and outputted to a first adder (exclusive OR) circuit through a remainder operation circuit; the adder circuit evaluates exclusive OR of the output of the remainder operation circuit and the inputted 8 bit ATM cell stream, the result of such an evaluation is inputted into a one-stage D flip-flop through a second adder; and the output of this one-stage D flip-flop is inputted into a CRC arithmetic operation circuit having a generating polyominal $X^8+X^2+$) $X+1$ and also into a decoder. The output of the CRC arithmetic operation circuit is inputted back to the second adder, and a cell synchronizing pulse is outputted from the decoder.

4 Claims, 5 Drawing Sheets

ATM CELL SYNCHRONOUS SYSTEM

BACKGROUND OF THE INVENTION

1. Field of the Invention

The present invention relates to an ATM (Asynchronous Transfer Mode) cell synchronizing method and a circuit exemplifying the method.

2. Prior Art

Services through broadband aspects of an integrated services digital network (hereinafter referred to as B-ISDN) have been presented recently. An asynchronous transfer mode (hereinafter referred to as an ATM), a transmission system for use in the B-ISDN, is a system to transfer an information unit called a cell that includes data containing various pieces of information such as an audio signal and a picture image signal etc., which are divided into a predetermined length and further include destination information called a header.

In accordance with the ITU-T Recommendation (the prior CCITT Recommendation), the cell comprises 53 bytes in all: 5 bytes for a header and 48 bytes for an information field. The 5 bytes for a cell header (40 bits) include a shortened cyclic code composed of an information point of 32 bits and a check point of 8 bits called HEC (Header Error Control) with a coset polynomial $X^6+X^4+X^2+1$ (01010101 pattern) added to the shortened cyclic code. The generating polynomial of the shortened cyclic code is $X^8+X^2+X+1$.

The ATM includes two options: a cell base system where a cell is transferred to a transmission line as it is and an SDH base system where a cell is first inserted into a data block called an SDH frame and then transmitted. Apart from the ITU-T Recommendation, occasionally in a transfer stage to a high speed ATM there is used a frame that is different from the SDH frame which includes a secondary group velocity frame in the cell relay system of NTT. In the systems which use such frame boundaries, each byte unit is formed between adjacent cells upon frame synchronization so that use of such boundaries ensures parallel processing for each byte to facilitate high speed communication.

In the ATM, it is necessary to find boundaries between adjacent cells in order to correctly take out cells transferred in succession through a transmission line. The processing is called cell synchronization wherein a header added to a head of a cell is utilized. More specifically, since the shortened cyclic code can be divided by the generating polynomial, division of the header 40 bits by the generating polynomial on a receiving side provides as the remainder $X^6+X^4+X^2+1$ which was added on a transmitting side, the property herein being utilized.

More specifically, when there is not found such cell boundaries (hunting state), a 40 bit fraction of the header size is taken out from received data and is divided by the generating polynomial, and when the remainder is $X^6+X^4+X^2+1$, the 40 bits taken out thereupon are decided to be the header, resulting in a pre-synchronized state. When the remainder is different from $X^6+X^4+X^2+1$, the next 40 bits displaced by 1 bit are likewise checked, and the check is performed in succession until the pre-synchronized state is reached. Further, in the presynchronized state, the position which is supposed to be a header of the next cell is checked in succession a predetermined number of times; and if the position is correct, a complete synchronized state is attained.

In the synchronized state, the header is subjected to error detection and error correction. The generating polynomial $X^8+X^2+X+1$ has a 1 bit error correcting capability and a plural bits error detection capability for the 40 bit header. For error detection, the header is divided by the generating polynomial, and when the remainder is not $X^6+X^4+X^2+1$, an error exists. For error correction, the position of an error bit is specified and corrected based upon a remainder pattern.

There is a divider that is the simplest one and comprises a cell phase detector for detecting such cell synchronization as described above.

FIG. 4 illustrates a concrete example of such a divider.

This divider circuit comprises an adder 11a into which data such as header information is inputted, 8 stage registers (flip-flop circuits) 13a, 13b, 13c, 13d, 13e, 13f, 13g and 13h connected with the adder 11a, an adder 11b connected between the register 13a and the register 13b, and an adder 11c connected between the register 13b and the register 13c.

8 bit feedback shift registers are generally used as a divider. Outputs from the respective shift registers at the time when 40 bits are just inputted into the divider provide the remainder.

Whether or not any errors exist in a header or which bit includes any error is found when all of the 40 bits of the header are inputted into the divider. More specifically, the error decision processing in which the associated cell is processed as a correct cell or corrected or abandoned as an error cell is performed after the lapse of time corresponding to 40 bits since the cell input has been started. Accordingly, the data corresponding to the 40 bits needs to be stored in a memory such as a shift register which is connected in parallel with a divider.

FIG. 5 shows an example of a prior art cell phase detector circuit for detecting the foregoing cell synchronization.

The cell phase detector circuit illustrated in FIG. 5 comprises: a divider which is similar to one shown in FIG. 4 and includes registers 23a–23h and adders (not shown), etc.; 40 bit shift registers 21(0)–21(39); and a decoder 25. The divider and the 40 bit shift registers are connected in parallel with each other, and each one of the registers 23a–23h of the divider is connected to the decoder 25. For estimating the remainder of the header 40 bits, the outputs of the 40 bit shift registers 21 are fed back to the input of the registers 23 which correspond to X6, X5, X of the divider. This is because the remainder yielded by dividing $X^{40}$ by the generating polynomial $G(X)=X^8+X^2X+1$ becomes $X^6+X^5+X$.

The outputs from the registers 23 are parallely inputted into the decoder 25 and then outputted as a cell synchronizing pulse.

The system described above uses the 40 bit shift registers 21 located in parallel with the divider. Thus, it does not require the addition of a memory circuit for storing data in order to ensure the error correcting function or a function of abandonment of an error cell. The system, however, has difficulty in increasing its operation speed because the processing needs to be done for each bit.

Referring to FIG. 6, there is illustrated another prior art example of the cell phase detector that has already been disclosed in Japanese Patent Application Laid-Open (Kokai) No. 5-191430.

The cell phase detector circuit of this prior art uses a system which operates a divider with an 8 bit parallel input/output.

The cell phase detector circuit includes registers (D flip-flops) 31(31a–31d) capable of 8 bit parallel input/output operation, a CRC arithmetic operation circuit 33 (33a14 33d) capable of 8 bit parallel input/output operation where any CRC arithmetic operation circuit receives a signal from a corresponding register and outputs a signal to an input of the next register, an adder circuit 37 that adds the same pattern as that added on the transmission side for receiving an output from the CRC arithmetic operation circuit 33d, a comparator circuit 39 that receives a cell input signal and an output signal from the adder circuit 37, and a coincidence detector circuit 41 that receives a comparison result signal and outputs a cell synchronizing signal.

A concrete method of designing the CRC arithmetic operation circuit 33 in FIG. 6 is as follows.

Assume that the states of the present registers in the divider circuits of FIG. 4 are F0(n)–F7(n), the next states are F0(n+1)–F7(n+1), and input data are d(n), then the generating polynomial of the CRC operation is $G(X)=X^8+X^2+X+1$ and hence the following equation (1) holds (where the addition is exclusive OR operation).

$$\begin{aligned}
F7(n+1) &= F6(n) \\
F6(n+1) &= F5(n) \\
F5(n+1) &= F4(n) \\
F4(n+1) &= F3(n) \\
F3(n+1) &= F2(n) \\
F2(n+1) &= F1(n) + F7(n) \\
F1(n+1) &= F0(n) + F7(n) \\
F0(n+1) &= D(n+1) + F7(n)
\end{aligned} \quad (1)$$

In the case of the parallel processing, outputs in the next states of F0(n)–F7(n) are F0(n+8)–F7(n+8). These outputs are as expressed as the following equation (2) on the basis of the above equation (1).

$$\begin{aligned}
F7(n+8) &= F7(n) + F6(n) + F5(n) + D(n+1) \\
F6(n+8) &= F6(n) + F5(n) + F4(n) + D(n+2) \\
F5(n+8) &= F5(n) + F4(n) + F3(n) + D(n+3) \\
F4(n+8) &= F4(n) + F3(n) + F3(n) + D(n+4) \\
F3(n+8) &= F7(n) + F3(n) + F2(n) + F1(n) + D(n+5) \\
F2(n+8) &= F6(n) + F2(n) + F1(n) + F0(n) + D(n+7) \\
F1(n+8) &= F6(n) + F1(n) + F0(n) + D(n+7) \\
F0(n+8) &= F7(n) + F6(n) + F0(n) + D(n+8)
\end{aligned} \quad (2)$$

The parallel CRC arithmetic operation circuit is designated as expressed by the equation (2). FIG. 6 shows the circuit in a concrete manner.

In FIG. 6, there are included four of the CRC arithmetic operation circuits. These circuits ensure low speed operation by executing parallel processing by making use of byte boundaries which are found by establishing frame synchronization. Input data passes through the CRC arithmetic operation circuit 33, etc., which are then prevented from keeping the original data. It is therefore necessary to additionally provide a memory circuit such as a register for holding the original data in parallel to the CRC arithmetic operation circuits for correcting the data and abandoning any error cell after establishment of the synchronization.

SUMMARY OF THE INVENTION

It is an object of the present invention to solve the problems with the prior art and to provide an ATM cell synchronous system and an ATM cell synchronous circuit which is capable of ensuring a low speed operation through parallel processing as the cell synchronous system without the need of an additional memory circuit for storing a cell header.

To achieve the object, the ATM cell synchronous method according to the present invention comprises the steps of: inputting an ATM cell stream of a received signal parallely and taking out bits corresponding to a header size; dividing bits which exceed the bits corresponding to the header size by a generating polynomial to derive a remainder; adding (or executing an exclusive OR of) the resulting remainder and the ATM cell stream; dividing the added signal by a generating polynomial; and decoding the divided output and outputting a cell synchronizing pulse.

Further, the ATM cell synchronous circuit according to the present invention comprises: a first register composed of a predetermined number of stages (parallel processing being executed in each of the stages) into which an ATM cell stream of a received signal is inputted in parallel and from which bits corresponding to a header size are taken out; a remainder from the output of the first register; a first adder for adding (or evaluating an exclusive OR of) the evaluated remainder and the input ATM cell stream; a second register into which an addition result of the first adder is inputted; a CRC arithmetic operation circuit for executing the CRC operation based upon the output of the second register, the generating polynomial of the CRC arithmetic operation circuit being $X^8+X^2+X+1$; a second adder provided between the first adder and the second register for adding the sum of the first adder and the CRC evaluation result of the CRC arithmetic operation circuit and outputting the result of such an addition to the second register; and a decoder for decoding the output of the second register to generate and output a cell synchronizing pulse.

The above and other objects, features and advantages of the present invention will become more apparent from the following description when taken in conjunction with the accompanying drawings in which a preferred embodiment of the present invention is shown by way of illustrated example.

DETAILED DESCRIPTION OF THE INVENTION

In what follows, an embodiment of the present invention will be described with reference to the accompanying drawings.

Figure 1:
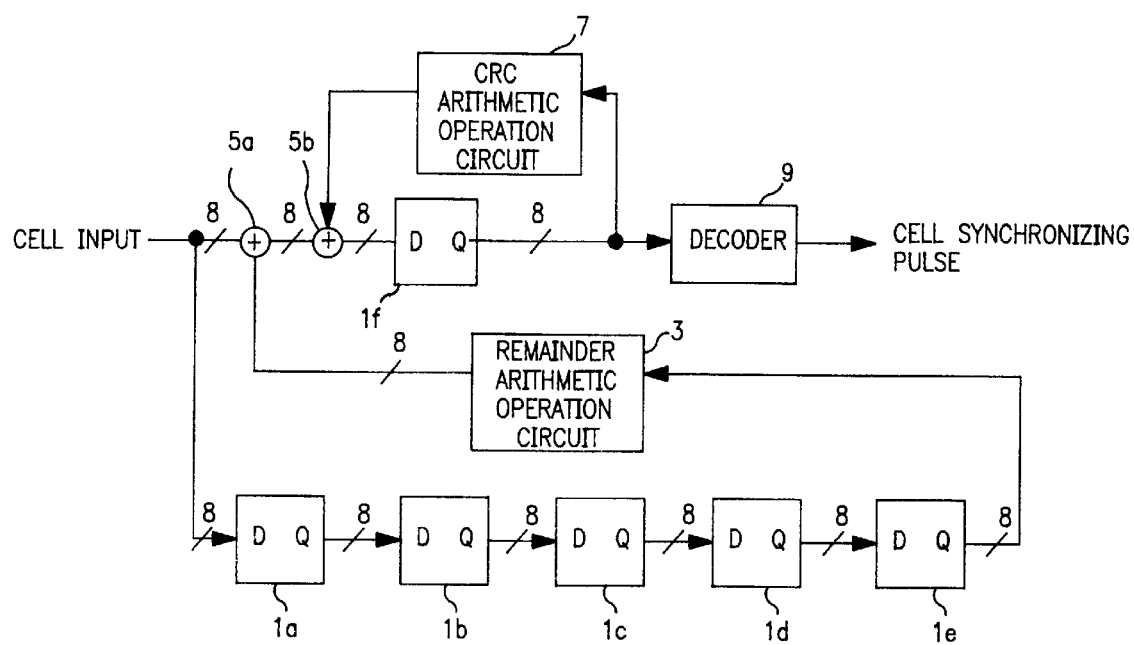
FIG. 1 is a block diagram of an ATM cell synchronous circuit to which an ATM cell synchronizing method according to the present invention is applied.

Referring to FIG. 1, there is illustrated in the form of a block diagram an ATM cell synchronous circuit to which an ATM cell synchronous system according to the present invention is applied.

With reference to FIG. 1, the schematic construction of the present invention will be described.

An 8 bit ATM cell stream is inputted into five stages of D flip-flops 1a, 1b, 1c, 1d and 1e and is outputted to an adder (exclusive OR) 5a through a remainder operation circuit 3. The adder 5a evaluates exclusive ORs of the output of the remainder operation circuit 3 and the foregoing input cell, and the result of the evaluation is inputted into a D flip-flop 1$f$ through an adder 5$b$. An output of the D flip-flop 1$f$ is inputted into a parallel processing CRC arithmetic operation circuit 7 represented by generating polynomial $X^8+X^2+X+1$ and also into a decoder 9. The output of the CRC arithmetic operation circuit 7 is inputted into the adder 5$b$, and a cell synchronizing pulse is outputted from the decoder 9.

The operation of the present invention is as follows.

Equations that represent the ATM cell synchronous circuit illustrated in FIG. 1 will be first derived in succession.

Figure 5:
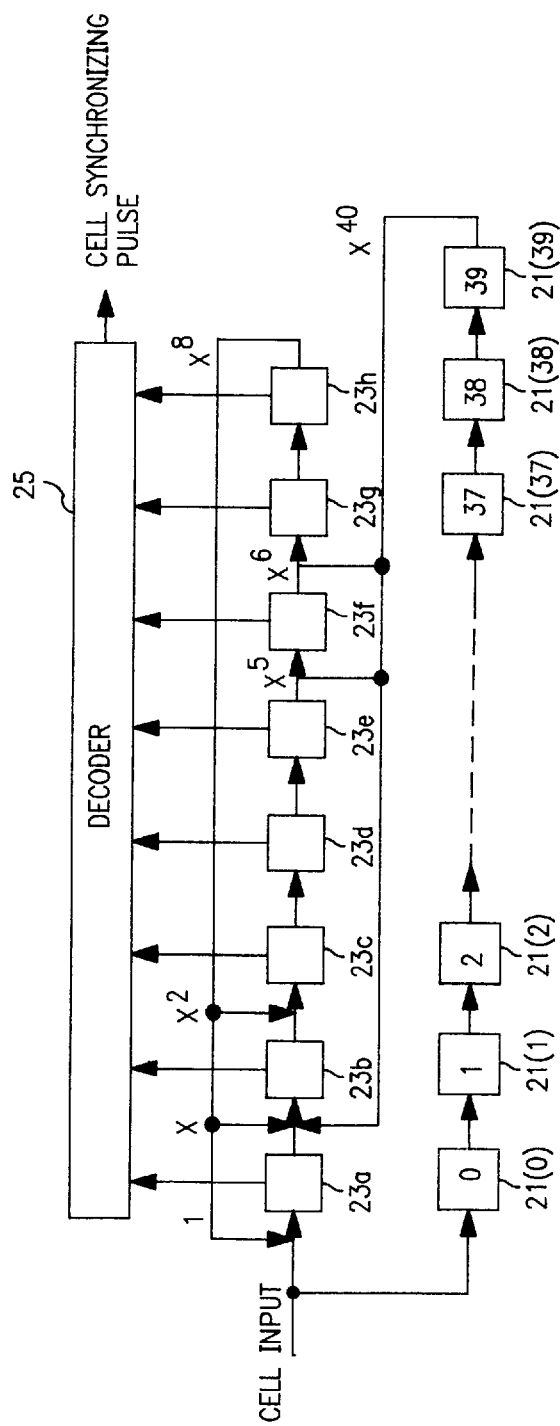
FIG. 5 is a block diagram illustrating the construction of a prior art cell phase detection circuit.
Figure 6:
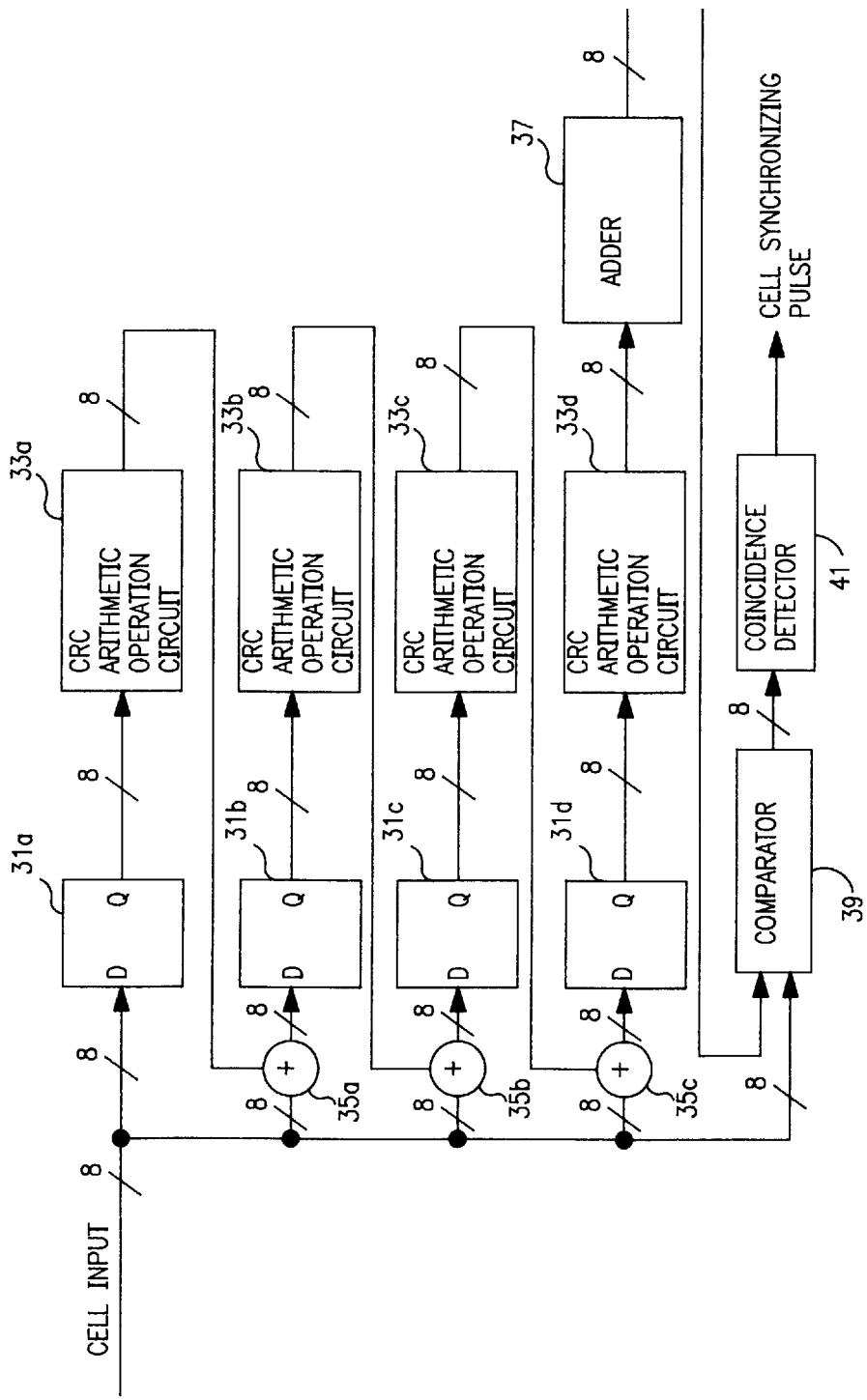
FIG. 6 is a block diagram illustrating the construction of a prior art cell phase detection circuit.

It is assumed that In FIG. 5, the present status of the registers is F0(n)–F7(n), and the next status of the same is F0(n+1)–F7(n+1), and the input data are D(n). Further, the output of the 40 bit shift register is assumed to be H39(n). Accordingly, since the output is fed back to the $X^6+X^5+X$ of the divider, the following relation holds.

$$\begin{aligned} F7(n+1) &= F6(n) \\ F6(n+1) &= F5(n) + H39(n) \\ F5(n+1) &= F4(n) + H39(n) \\ F4(n+1) &= F3(n) \\ F3(n+1) &= F2(n) \\ F2(n+1) &= F1(n) + F7(n) \\ F1(n+1) &= F0(n) + F7(n) + H39(n) \\ F0(n+1) &= D(n+1) + F7(n) \end{aligned} \quad (3)$$

Further, since the status of the H39(n) after a time t is a value of the shift register before the time t, the following equation is obtained:

H39(n)=H39(n−t).

Based upon the above relation, outputs F0(n+8)–F7(n+8) at the next status of the outputs F0(n)–7(n) in the parallel processing are as follows.

$$\begin{aligned} F7(n+8) &= D(n+1) + F7(n) + F6(n) + F5(n) + H39(n) + H38(n) + H34(n) + H33(n) \\ F6(n+8) &= D(n+2) + F6(n) + F5(n) + F4(n) + H38(n) + H37(n) + H33(n) + H32(n) \\ F5(n+8) &= D(n+3) + F5(n) + F4(n) + F3(n) + H37(n) + H36(n) + H32(n) \\ F4(n+8) &= D(n+8) = D(n+4) + F4(n) + F3(n) + F2(n) + H39(n) + H36(n) + H35(n) \\ F3(n+8) &= D(n+5) + F7(n) + F3(n) + F2(n) + F1(n) + H38(n) + H35(n) + H34(n) \\ F2(n+8) &= D(n+6) + F6(n) + F2(n) + F1(n) + F0(n) + H39(n) + H37(n) + H34(n) + H33(n) \\ F1(n+8) &= D(n+7) + F6(n) + F1(n) + F0(n) + H39(n) + H36(n) + H34(n) + H32(n) \\ F0(n+8) &= D(n+8) + F7(n) + F6(n) + F0(n) + H39(n) + H35(n) + H34(n) \end{aligned} \quad (4)$$

The equation (4) is represented by the circuit illustrated in FIG. 1

For realizing the equation (4), the ATM cell synchronous circuit in the present embodiment includes two arithmetic operation circuits: the CRC arithmetic operation circuit and the remainder arithmetic operation circuit.

Figure 2:
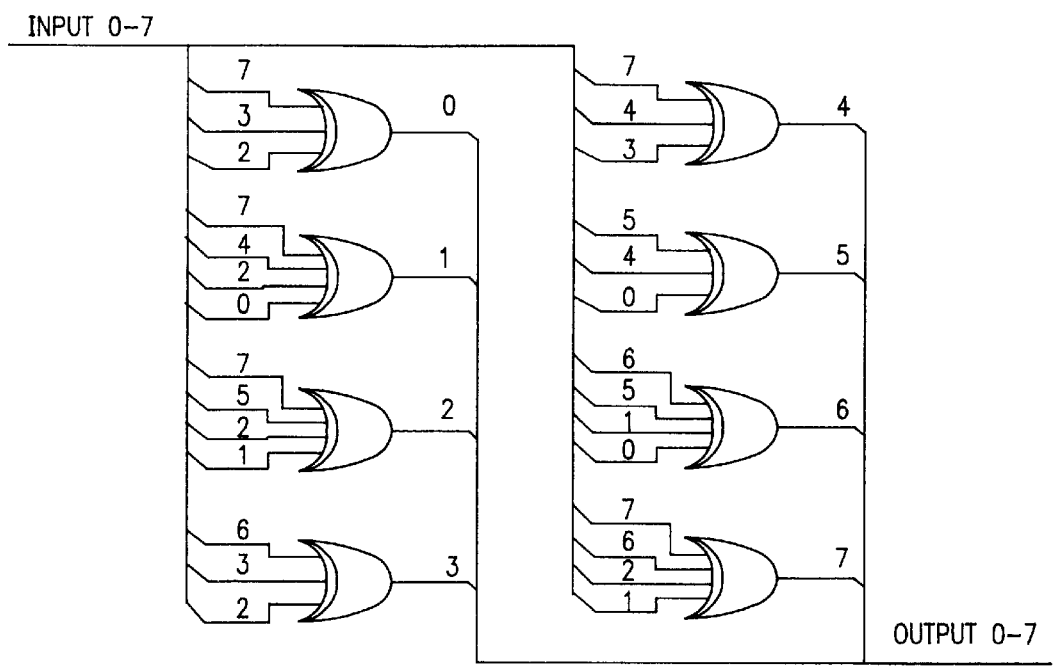
FIG. 2 is a circuit diagram illustrating the construction of a remainder arithmetic operation circuit illustrated in FIG. 1.
Figure 3:
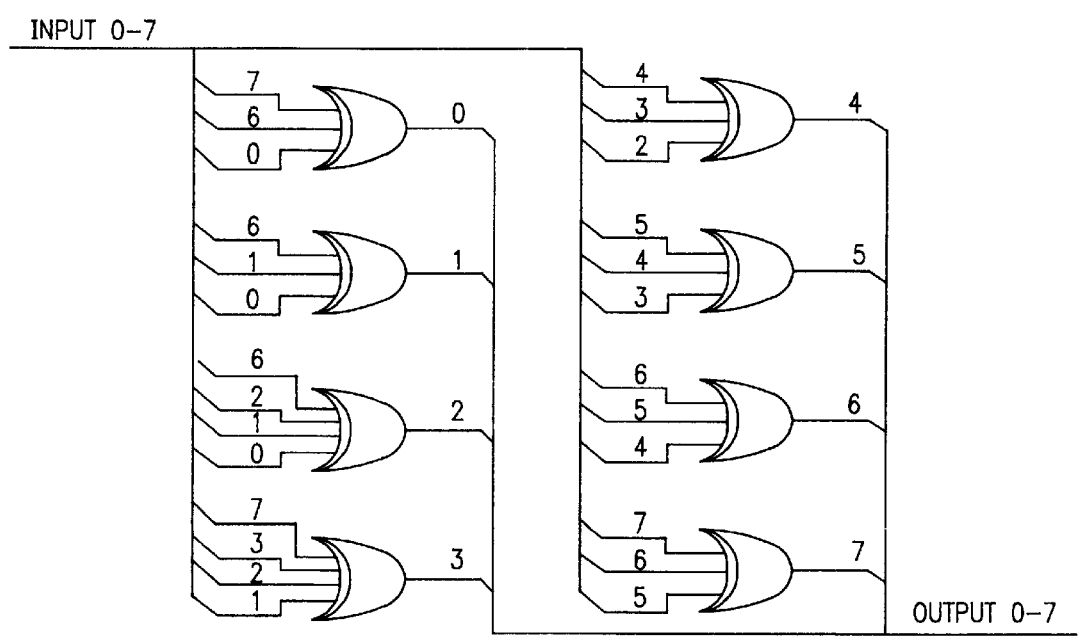
FIG. 3 is a circuit diagram illustrating the construction of a CRC arithmetic operation circuit illustrated in FIG. 1.
Figure 4:
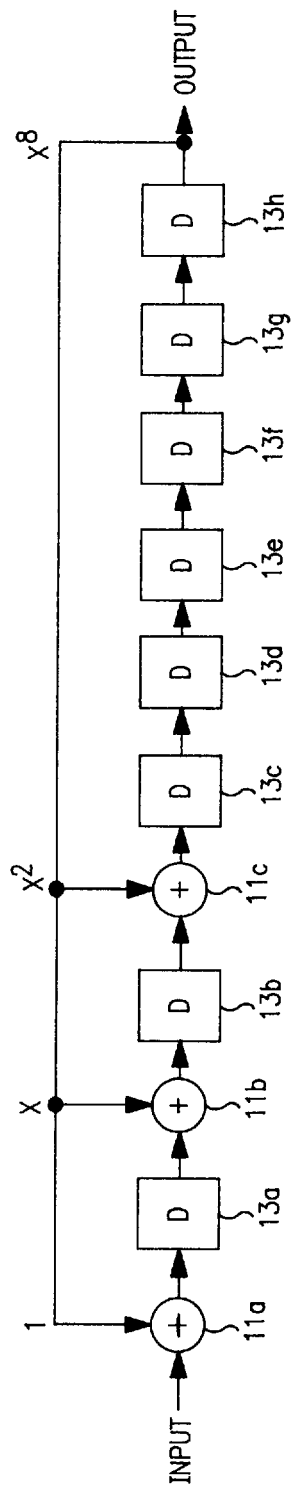
FIG. 4 is a block diagram illustrating the construction of a prior art divider.

The CRC arithmetic operation circuit is constructed from exclusive ORs as illustrated in FIG. 3. Inputs of the remainder arithmetic operation circuit that are the outputs of the 40 bit shift registers in parallel construction are H32(n)–H39 (n). With the assumption of these inputs to be 0–7, the remainder arithmetic operation circuit is constructed from exclusive ORs as illustrated in FIG. 2 based upon the foregoing equation (4).

With the construction of FIG. 1 described above, data corresponding to 40 bits can be secured so that there is eliminated the need of securing other data for error correction and error cell abandonment. Further, boundaries among bytes estimated upon frame synchronization in a previous stage are used to effect the parallel processing for every 8 bits so that low speed clock operation is ensured.

According to the present invention, as described above, the low speed operation through the parallel processing is ensured as the cell synchronous system and input data corresponding to a header size is held so that the techniques of the present invention are also applicable to the error correction and error cell abandonment after establishment of the synchronization and hence there is eliminated the need of an additional new memory circuit such as a shift register for storing a cell header.

It is a matter of course to provide, as needed, a delay circuit and the like for establishing the synchronization although it is not described in the present embodiment.

The present invention, as described above, ensures low speed operation through the parallel processing of the cell synchronous system and is also applicable to error correction and error cell abandonment after establishment of the synchronization without requiring an additional memory circuit for storing a cell header.

I claim:

1. An ATM cell synchronizing method comprising the steps of:

inputting an ATM cell stream of a received signal parallely and taking out bits corresponding to a header size;

dividing bits that exceed said bits corresponding to said header size by a generating polynomial to derive a remainder;

adding said remainder to said ATM cell stream;

adding a resultant to a signal obtained from said addition to generate an output signal;

processing said output signal by a generating polynomial to derive said resultant; and decoding said output signal to generate a cell synchronizing pulse.

2. An ATM cell synchronous circuit comprising:

a first register composed of a predetermined number of stages into which an ATM cell stream of a received signal is inputted in parallel and from which bits corresponding to a header size are taken out;

a remainder arithmetic operation circuit for evaluating and outputting a remainder from the output of the first register;

a first adder for adding said evaluated remainder and said input ATM cell stream;

a second register for inputting an addition result of the first adder;

a CRC arithmetic operation circuit for executing CRC operation based upon the output of the second register;

a second adder provided between said first adder and said second register for adding the addition result of said first adder and the CRC evaluation result of said CRC arithmetic operation circuit and outputting a result of said adding to said second register; and a decoder for decoding the output of said second register to generate and output a cell synchronizing pulse.

3. An ATM cell synchronizing method comprising the steps of:

inputting an ATM cell stream of a received signal in parallel by n-bit;

outputting said inputted n-bit received signal with a delay of a predetermined period of time which is effected by a register means;

dividing, by a generating polynomial, said n-bit received signal which has been outputted by said register means with said delay, thus obtaining a remainder;

calculating an exclusive logical addition of said n-bit received signal and said remainder;

conducting a CRC arithmetic operation on a result of said exclusive logical addition; and decoding said CRC arithmetic operation result and outputting a cell synchronizing pulse.

4. An ATM cell synchronizing method comprising the steps of:

inputting an ATM cell stream of a received signal parallely and taking out bits corresponding to a header size;

dividing bits that exceed said bits corresponding to said header size by a generating polynomial to derive a remainder;

adding the resulting remainder to said ATM cell stream;

dividing a signal obtained from said addition by a generating polynomial to obtain an output signal; and decoding said output signal to generate a cell synchronizing pulse.

* * * * *

UNITED STATES PATENT AND TRADEMARK OFFICE
CERTIFICATE OF CORRECTION

PATENT NO. : 5,771,249
DATED : June 23, 1998
INVENTOR(S) : Shigeki Yanagisawa

It is certified that error appears in the above-indentified patent and that said Letters Patent is hereby corrected as shown below:

Item [30] Foreign Application Priority Data:

Add --Sep. 2, 1994 [JP] Japan ....... 6-234077
      Nov. 24, 1994 [JP] Japan ....... 6-314140--

Signed and Sealed this

Twenty-fifth Day of August, 1998

Attest:

BRUCE LEHMAN

Attesting Officer

Commissioner of Patents and Trademarks